(12) United States Patent
Chen et al.

(10) Patent No.: US 10,288,929 B2
(45) Date of Patent: May 14, 2019

(54) DISPLAY PANELS AND LIQUID CRYSTAL DISPLAY DEVICES

(71) Applicant: Shenzhen China Star Optoelectronics Technology Co., Ltd., Shenzhen, Guangdong (CN)

(72) Inventors: Zhenxia Chen, Guangdong (CN); Minghui Li, Guangdong (CN); Lixuan Chen, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 56 days.

(21) Appl. No.: 15/515,273

(22) PCT Filed: Mar. 1, 2017

(86) PCT No.: PCT/CN2017/075318
§ 371 (c)(1),
(2) Date: Mar. 29, 2017

(87) PCT Pub. No.: WO2018/133176
PCT Pub. Date: Jul. 26, 2018

(65) Prior Publication Data
US 2018/0231834 A1    Aug. 16, 2018

(51) Int. Cl.
*G02B 5/30* (2006.01)
*G02F 1/01* (2006.01)
(Continued)

(52) U.S. Cl.
CPC ..... *G02F 1/133528* (2013.01); *G02B 5/3033* (2013.01); *G02F 1/0107* (2013.01);
(Continued)

(58) Field of Classification Search
None
See application file for complete search history.

(56) References Cited

U.S. PATENT DOCUMENTS 9,559,331 B2 * 1/2017 Zeng ............... H01L 51/56
2003/0067565 A1 * 4/2003 Yamamura ...... G02F 1/133528
349/65

(Continued)

FOREIGN PATENT DOCUMENTS

CN    1512216 A    7/2004
CN    1641437 A    7/2005
(Continued)

*Primary Examiner* — Ryan Crockett
(74) *Attorney, Agent, or Firm* — Andrew C. Cheng

(57) ABSTRACT

The present disclosure relates to a display panel including a first substrate, a second substrate, and a liquid crystal layer between the first substrate and the second substrate. The display panel also includes a first polarized film and a first frame glue, and the first polarized film adheres to a surface of the first substrate facing toward the second substrate. The first frame glue connects between the first substrate and the second substrate such that a closed cell is formed cooperatively by the first substrate and the second substrate. The first polarized film and the liquid crystal layer are received within the closed cell. The present disclosure also relates to a liquid crystal display device. The first polarized film is isolated from external environment so as to enhance the stability of the first polarized film.

17 Claims, 4 Drawing Sheets

(51) Int. Cl.
　　　*G02F 1/1335*　　　(2006.01)
　　　*G02F 1/1339*　　　(2006.01)
　　　*G02F 1/1341*　　　(2006.01)
(52) U.S. Cl.
　　　CPC .......... *G02F 1/1339* (2013.01); *G02F 1/1341*
　　　　　　　(2013.01); *G02F 2201/50* (2013.01)

(56) References Cited

U.S. PATENT DOCUMENTS

| | | | |
|---|---|---|---|
| 2004/0141141 A1* | 7/2004 | Ota | G02F 1/133305 349/153 |
| 2008/0143949 A1* | 6/2008 | Ino | G02F 1/133308 349/151 |
| 2018/0101066 A1* | 4/2018 | Chen | G02F 1/133514 |
| 2018/0101067 A1* | 4/2018 | Chen | G02F 1/133514 |
| 2018/0173033 A1* | 6/2018 | Suga | G02F 1/1339 |
| 2018/0205034 A1* | 7/2018 | Liu | H01L 51/56 |

FOREIGN PATENT DOCUMENTS

| | | |
|---|---|---|
| CN | 1641438 A | 7/2005 |
| CN | 1655021 A | 8/2005 |
| CN | 1655029 A | 8/2005 |
| JP | 2000111893 A | 4/2000 |

\* cited by examiner

DISPLAY PANELS AND LIQUID CRYSTAL DISPLAY DEVICES

CROSS REFERENCE

This application claims the priority of Chinese Patent Application No. 2017100426686, entitled "Display panels and liquid crystal display devices", filed on Jan. 20, 2017, the disclosure of which is incorporated herein by reference in its entirety.

FIELD OF THE INVENTION

The present invention relates to liquid crystal manufacturing field, and more particularly to a display panel and a liquid crystal display device.

BACKGROUND OF THE INVENTION

With the development of the economics and the technology, people rely greatly on information exchange and transfer. Thin film transistor liquid crystal display (TFT-LCD) has been a main device for accomplishing information exchange, and thus is a hot spot of optoelectronic researches. Polarizer is a key component contributing to the performance of TFT-LCD, such as transmission rate, brightness, and thickness. Usually, the polarizers are made by iodine-related materials. The polarizers include a iodine polarizer film and a supporting protection film arranged at two lateral surfaces of the iodine polarizer film. The supporting protection film not only protects the polarizer film, but also fixes the polarizer.

Conventionally, the polarizer is adhered to the color film substrate of a liquid crystal cell or a surface of an array substrate facing away the liquid crystal layer, i.e., the outer surface of the liquid crystal cell. When the display device operates in a wet and hot environment, the supporting protection film may warp, which results in the warped polarizer. Further, the liquid crystal cell may warp, and the display device may malfunction, or the wrapped polarizer may detach from the liquid crystal cell.

SUMMARY OF THE INVENTION

The present disclosure relates to a display panel and a liquid crystal display device to reduce a thickness of the polarizer, which contributes to super thin design of liquid crystal display devices.

In one aspect, a display panel includes: a first substrate, a second substrate, and a liquid crystal layer between the first substrate and the second substrate, wherein the display panel also comprises a first polarized film and a first frame glue, the first polarized film adheres to a surface of the first substrate facing toward the second substrate, the first frame glue connects between the first substrate and the second substrate such that a closed cell is formed cooperatively by the first substrate and the second substrate, and the first polarized film and the liquid crystal layer are received within the closed cell.

Wherein the first substrate comprises a pair of first surfaces and a pair of first sidewalls connecting the first surfaces, and the second substrate comprises a pair of second surfaces and a pair of second sidewalls connecting the second surfaces, and the first frame glue adheres to the first sidewalls and the second sidewalls.

Wherein the display panel further comprises a second frame glue adhering to the second surfaces of the second substrate facing toward the first substrate and adhering to a surface of the first polarized film facing toward the second substrate.

Wherein a projection of the second frame glue on the first substrate is within a scope defined by the first polarized film, and the liquid crystal is arranged within a closed space defined by the first polarized film, the second frame glue, and the second substrate.

Wherein the display panel further comprises a second polarized film being adhered to the second surfaces of the second substrate facing toward the first substrate.

Wherein the display panel further comprises a second frame glue adhering to the second surfaces of the second substrate facing toward the first substrate and adhering to a surface of the first polarized film facing toward the second substrate.

Wherein a projection of the second frame glue on the first substrate is within a scope defined by the first polarized film, and the liquid crystal is arranged within a closed space defined by the first polarized film, the second frame glue, and the second substrate.

Wherein the first frame glue comprises a main body and a protrusion portion on the main body, and the protrusion portion is arranged between the first substrate and the second substrate.

In another aspect, a liquid crystal display device includes: a backlight module and a display panel, the light beams emitted from a backlight source of the backlight module passing through the display panel such that the display panel displays images, the display panel includes: a first substrate, a second substrate, and a liquid crystal layer between the first substrate and the second substrate, wherein the display panel also comprises a first polarized film and a first frame glue, the first polarized film adheres to a surface of the first substrate facing toward the second substrate, the first frame glue connects between the first substrate and the second substrate such that a closed cell is formed cooperatively by the first substrate and the second substrate, and the first polarized film and the liquid crystal layer are received within the closed cell.

Wherein the first substrate comprises a pair of first surfaces and a pair of first sidewalls connecting the first surfaces, and the second substrate comprises a pair of second surfaces and a pair of second sidewalls connecting the second surfaces, and the first frame glue adheres to the first sidewalls and the second sidewalls.

Wherein the display panel further comprises a second frame glue adhering to the second surfaces of the second substrate facing toward the first substrate and adhering to a surface of the first polarized film facing toward the second substrate.

Wherein a projection of the second frame glue on the first substrate is within a scope defined by the first polarized film, and the liquid crystal is arranged within a closed space defined by the first polarized film, the second frame glue, and the second substrate.

Wherein the display panel further comprises a second polarized film being adhered to the second surfaces of the second substrate facing toward the first substrate.

Wherein the display panel further comprises a second frame glue adhering to the second surfaces of the second substrate facing toward the first substrate and adhering to a surface of the first polarized film facing toward the second substrate.

Wherein a projection of the second frame glue on the first substrate is within a scope defined by the first polarized film, and the liquid crystal is arranged within a closed space defined by the first polarized film, the second frame glue, and the second substrate.

Wherein the first frame glue comprises a main body and a protrusion portion on the main body, and the protrusion portion is arranged between the first substrate and the second substrate.

Wherein the backlight module is an edge-type backlight module, the first substrate is adopted to operate as a light guiding plate of the backlight module to guide the light beams from the first sidewalls to the second substrate.

In view of the above, the first polarized film 50 adheres to the first substrate 10, and is arranged within the closed cell formed by the first substrate 10, the second substrate 20, and the first frame glue 30. Thus, the first polarized film is prevented from being affected, which enhances the stability of the first polarized film 50 and the second polarized film 52 and ensure the normal operations of the display device. Further, the first polarized film 50 is directly adhered to the first substrate 10 without configuring two supporting protection films. Thus, the thickness of the polarizer is reduced, which contributes to the super thin design of the liquid crystal display device.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
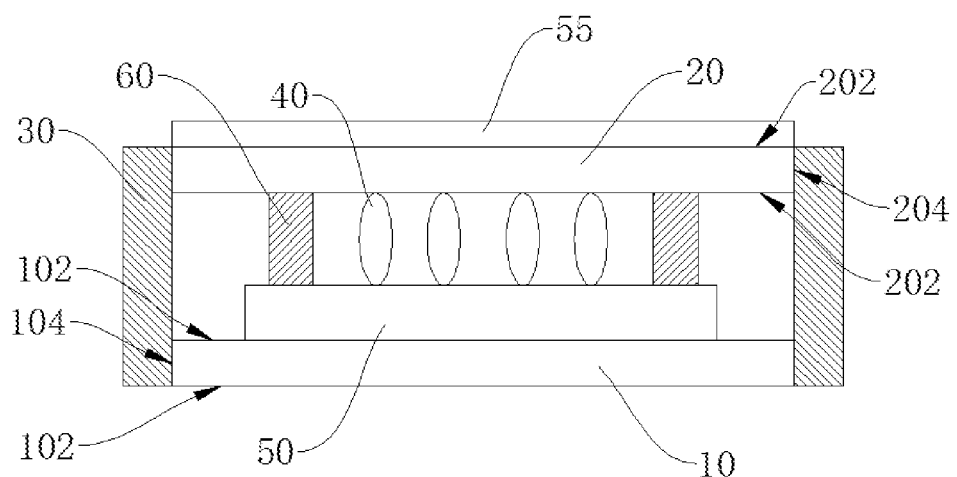
FIG. 1 is a schematic view of the display panel in accordance with a first embodiment of the present disclosure.
Figure 2:
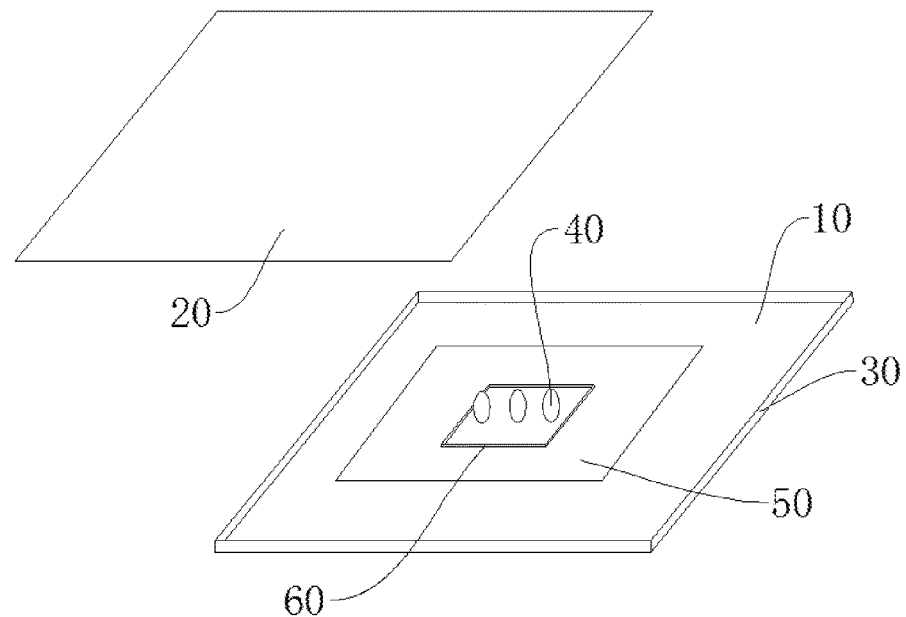
FIG. 2 is an exploded view of the display panel in accordance with the first embodiment of the present disclosure.

Referring to FIGS. 1 and 2, the display panel in the first embodiment includes a first substrate 10, a second substrate 20, and a liquid crystal layer 40 between the first substrate 10 and the second substrate 20. In an example, the first substrate 10 and the second substrate 20 are respectively one of a color film (CF) substrate and an array substrate. The array substrate includes a plurality of pixel cells arranged in a matrix. Each of the pixel cells includes one pixel electrode and one TFT. The array substrate is also configured with data lines and scanning lines, and the data lines are perpendicular to the scanning lines. Further, the scanning lines connect to a gate of the TFT on each of the rows so as to turn on or off the TFTs, that is, the connection between a drain and a source. The data lines connects to the drain of the TFTs on each of the columns, and each of the pixel electrodes connects to the source of the TFT. The data line controls the voltage of the pixel electrode to control a driving voltage between the first substrate 10 and the second substrate 20 and to control the alignment of the liquid crystal molecules within the liquid crystal layer 40, i.e., the brightness of the backlit. The CF substrate controls a backlight source to display red, green, and blue light beams so as to change the content of the displayed image. The first substrate 10, the second substrate 20, and the liquid crystal layer 40 display the colorful images by the backlight source provided by the backlight module.

In the embodiment, the display panel also includes a first polarized film 50 and a first frame glue 30. The first polarized film 50 adheres to a surface of the first substrate 10 facing toward the second substrate 20, the first frame glue 30 connects between the first substrate 10 and the second substrate 20 such that a closed cell is formed cooperatively by the first substrate 10 and the second substrate 20, and the first polarized film 50 and the liquid crystal layer 40 are received within the closed cell. Further, the first substrate 10 includes a pair of first surfaces 102 and a pair of first sidewalls 104 connecting the first surfaces 102. In one embodiment, the first substrate 10 is rectangular-shaped, that is, the first surfaces 102 are rectangles having the same dimension. The four first sidewalls 104 respectively connects the four edges of the first surfaces 102. The second substrate 20 includes a pair of second surfaces 202 and a pair of second sidewalls 204 connecting the second surfaces 202. In one embodiment, the second substrate 20 are rectangular-shaped, that is, the second surfaces 202 are one pair of rectangles having the same dimension. The four second sidewalls 204 respectively connects to the four edges of the pair of the second surfaces 202. The first polarized film 50 adheres to the surface of the first substrate 10 facing toward the first surfaces 102. Specifically, the glue being adopted to adhere first polarized film 50 to the first substrate 10 is transparent such that the transmission rate may not be affected. The first frame glue 30 connects between the first substrate 10 and the second substrate 20. In one embodiment, the first frame glue 30 adheres to the first sidewalls 104 and the second sidewalls 204. In other embodiment, the first frame glue 30 may arranged between the first substrate 10 and the second substrate 20, and the first frame glue 30 adheres to the first surfaces 102 of the first substrate 10 facing toward the second substrate 20 and adheres to the second surfaces 202 of the second substrate 20 facing toward the first substrate 10. The first frame glue 30, the first substrate 10, and the second substrate 20 cooperatively form the closed cell to isolate the first polarized film 50 and the display panel from external environment. In one embodiment, the first frame glue 30 may be edge glue so as to reduce the cost. In other embodiments, a portion of the first frame glue 30 may be edge glue so as to reduce the manufacturing process.

The first polarized film 50 adheres to the first substrate 10, and the first polarized film 50 is arranged within the closed cell formed by adhering the first substrate 10, the second substrate 20, and the first frame glue 30 to isolate the first polarized film 50 from the external environment. Thus, the first polarized film is prevented from being affected, which enhances the stability of the first polarized film 50 and ensure the normal operations of the display device. Further, the first polarized film 50 is directly adhered to the first substrate 10 without being protected by two layers of supporting protection films. Such configuration reduces the thickness of the polarizer and contributes to the super thin design of liquid crystal display device.

Further, a second surface of the second substrate 20 facing away the first substrate 10 is bonded with a second polarizer 55, and a polarized direction of the second polarizer 55 is perpendicular to the polarized direction of the first polarized film 50. The light beams emitted from the backlight module pass through the first polarized film 50, and the polarized directions of the liquid crystal molecules in a twisted state are changed. Afterward, the light beams pass through the second polarizer 55 to form the images. Specifically, the second polarizer 55 includes two supporting protection films and a polarized film between the two supporting protection films.

In the embodiment, the display panel also includes a second frame glue 60 adhering to the second surfaces 202 facing toward the first substrate 10 and adhering to a surface of the first polarized film facing toward the second substrate 20. The second frame glue 60 is of a certain thickness, and the thickness of the second frame glue 60 depends on the overall thickness of the display panel. The second frame glue 60 is adhered between the first polarized film 50 and the second substrate 20. In one aspect, one lateral surface of the first polarized film 50 is adhered to the first surfaces 102 of the first substrate 10 by the transparent glue, and the other lateral surface of the first polarized film 50 is adhered to the second surfaces 202 of the second substrate 20 by the second frame glue 60, which enhances the stability of the first polarized film 50 within the display panel. That is, by configuring the second frame glue 60, the first polarized film 50 may be stably arranged within the cell formed by the first substrate 10, the second substrate 20, and the first frame glue 30. In another aspect, the second frame glue 60 is arranged between the first substrate 10 and the second substrate 20, and is within the cell formed by the first substrate 10, the second substrate 20, and the first frame glue 30 so as to support the cell and to enhance the stability of the display panel.

In one embodiment, a projection of the second frame glue 60 on the first substrate 10 is within a scope defined by the first polarized film 50, and the liquid crystal layer 40 is arranged within a closed space defined by the first polarized film 50, the second frame glue 60, and the second substrate 20. Further, the liquid crystal molecules within the liquid crystal layer 40 only contact the surfaces of the first polarized film 50, the second frame glue 60, and the second substrate 20. The second frame glue 60 limits the locations of the liquid crystal molecules, and thus the liquid crystal molecules cannot contact with the edge surfaces of the first polarized film 50. This effectively prevents the liquid crystal molecules from being contacted with the polarized film via edge surfaces of the polarized films, and thus the liquid crystal molecules and the polarized films are prevented from being affected by each other. Also, the life cycle of the liquid crystal molecules and the first polarized film 50 are guaranteed.

Figure 3:
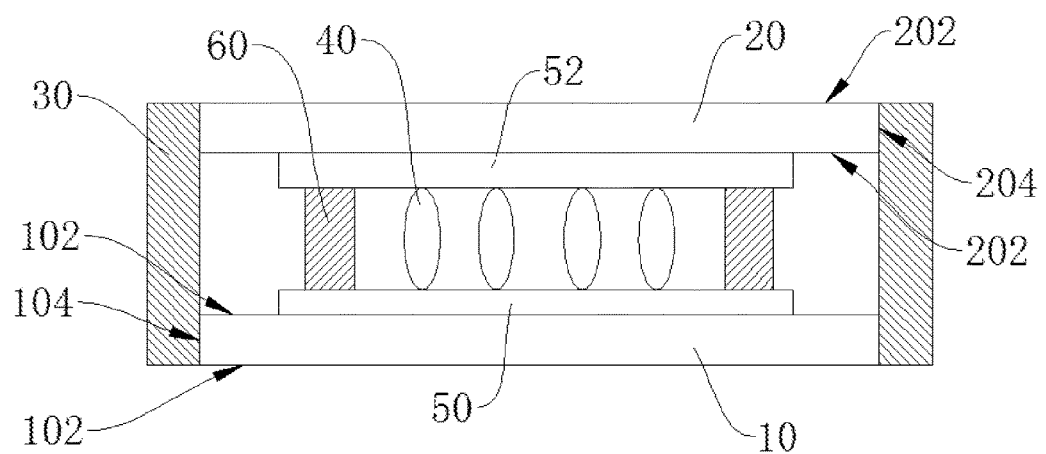
FIG. 3 is a schematic view of the display panel in accordance with a second embodiment of the present disclosure.

Referring to FIG. 3, the difference between the display panel in the second embodiment and the first embodiment resides in that: the display panel in the second embodiment also includes a second polarized film 52 being adhered to the second surfaces 202 of the second substrate 20 facing toward the first substrate 10, and the display panel is not configured with the second polarizer 55. Compared with the second polarizer 55, the second polarized film 52 is not configured with the two supporting protection films. Generally, the thickness of the polarizer is about 200 μm, and a sum of the thickness of the two supporting protection films is about 50 μm. That is, the thickness of the second polarized film 52 is less than the thickness of the second polarizer 55 for 25%, which contributes to the super thin design of the liquid crystal display device. Further, the first polarized film 50 adheres to the first substrate 10, and the second polarized film 52 adheres to the second substrate 20, and the first polarized film 50 and the second polarized film 52 are arranged within the closed cell formed by adhering the first substrate 10, the second substrate 20, and the first frame glue 30. The first polarized film 50 and the second polarized film 52 are isolated from the external environment, and thus the first polarized film is prevented from being affected, which enhances the stability of the first polarized film 50 and the second polarized film 52 and ensure the normal operations of the display device.

In one embodiment, the second frame glue 60 adheres to the surface of the second polarized film 52 facing toward the first substrate 10, and adheres to the surface of the first polarized film 50 facing toward the second substrate 20, that is, the second frame glue 60 is arranged between the first polarized film 50 and the second frame glue 60. Specifically, the second frame glue 60 is of a certain thickness, and the thickness of the second frame glue 60 depends on the overall thickness of the display panel. The second frame glue 60 is arranged between the first polarized film 50 and the second polarized film 52. In one aspect, one lateral surface of the first polarized film 50 is adhered to the first surfaces 102 of the first substrate 10 by the transparent glue, and the other lateral surface of the first polarized film 50 is adhered to the surfaces is adhered to the lateral surfaces of the second polarized film 52 by the second frame glue 60. One of the lateral surfaces of the second polarized film 52 adhere to the second surfaces 202 of the second substrate 20 by the transparent glue, and the other lateral surfaces of the second polarized film 52 adheres to the lateral surface of the first polarized film 50 via the second frame glue 60, which enhances the stability of the first polarized film 50 within the display panel. That is, by configuring the second frame glue 60, the first polarized film 50 may be stably arranged within the cell formed by the first substrate 10, the second substrate 20, and the first frame glue 30. In another aspect, the second frame glue 60 is arranged between the first substrate 10 and the second substrate 20, and is within the cell formed by the first substrate 10, the second substrate 20, and the first frame glue 30 so as to support the cell and to enhance the stability of the display panel.

In one embodiment, a projection of the second frame glue 60 on the first substrate 10 is within a scope defined by the first polarized film 50, and the liquid crystal layer 40 is arranged within a closed space defined by the first polarized film 50, the second frame glue 60, and the second substrate 20. Further, the liquid crystal molecules within the liquid crystal layer 40 only contact the surfaces of the first polarized film 50, the second frame glue 60, and the second substrate 20. The second frame glue 60 limits the locations of the liquid crystal molecules, and thus the liquid crystal molecules cannot contact with the edge surfaces of the first polarized film 50. This effectively prevents the liquid crystal molecules from being contacted with the polarized film via edge surfaces of the polarized films, and thus the liquid crystal molecules and the polarized films are prevented from being affected by each other. Also, the life cycle of the liquid crystal molecules and the first polarized film 50 are guaranteed.

The second frame glue 60 is mixed with fibers to increase the thickness of the second frame glue 60 so as to form the closed structure of the first polarized film 50 and the second polarized film 52. Also, the end surfaces of the liquid crystal layer 40, the first polarized film 50, and the second polarized film 52 are isolated to enhance to the strength of the second frame glue 60, and thus the first substrate 10 and the second substrate 20 may be supported.

Further, the first polarized film 50 and the second frame glue 60 are dye-based polarized films, which is characterized by excellent moisture resistance and heat resistance, and may be well adapted to the harsh working environment.

Figure 4:
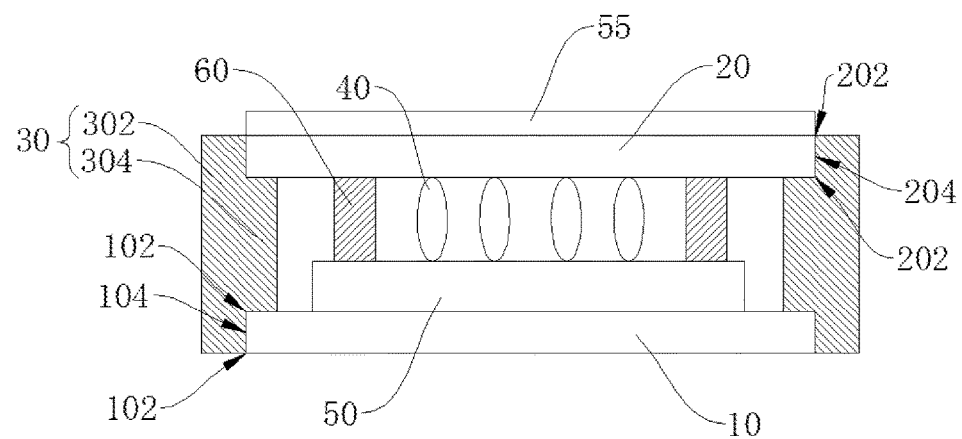
FIG. 4 is a schematic view of the display panel in accordance with a third embodiment of the present disclosure.

Referring to FIG. 4, the difference between the display panel in the third embodiment and the first embodiment resides in that: the first frame glue 30 includes a main body 302 and a protrusion portion 304 on the main body 302. The protrusion portion 304 is arranged between the first substrate 10 and the second substrate 20, that is, the protrusion portion 304 adheres to the first surfaces 102 of the first substrate 10 facing toward the second substrate 20, and adheres to the second surfaces 202 of the second substrate 20 facing toward the first substrate 10. The main body 302 adheres to the first sidewalls 104 and the second sidewalls 204. The protrusion portion 304 adheres to the first surfaces 102 and the second surfaces 202, which enhances the sealing performance of the cell formed by the first frame glue 30, the first substrate 10, and the second substrate 20. Thus, the first polarized film is prevented from being affected, which enhances the stability of the first polarized film 50 and the second polarized film 52 and ensure the normal operations of the display device.

Figure 5:
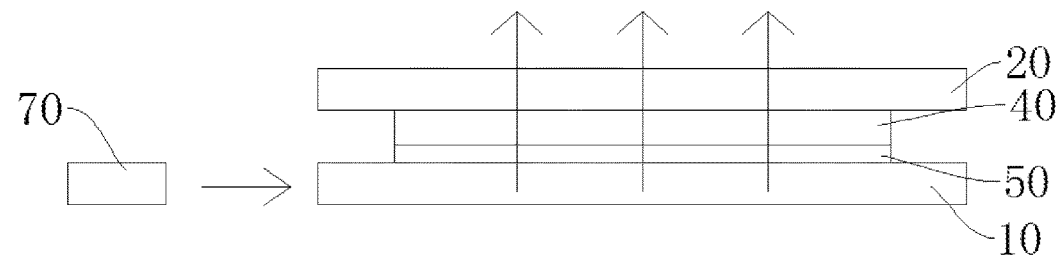
FIG. 5 is a schematic view of the liquid crystal display device in accordance with the first embodiment of the present disclosure.

Referring to FIG. 5, the liquid crystal display device includes a backlight module and the above display panel. The light beams emitted from a backlight source of the backlight module pass through the display panel such that the display panel may display the images. Specifically, the backlight module includes a LED lamp set 70 and a light guiding plate 702. The light beams emitted from the LED lamp set 70 enter the light guiding plate 702 via the lateral surfaces and are then directed to the display panel such that the display panel may display the images.

The first polarized film 50 adheres to the first substrate 10, and is arranged within the closed cell formed by the first substrate 10, the second substrate 20, and the first frame glue 30. Thus, the first polarized film is prevented from being affected, which enhances the stability of the first polarized film 50 and the second polarized film 52 and ensure the normal operations of the display device. Further, the first polarized film 50 is directly adhered to the first substrate 10 without configuring two supporting protection films. Thus, the thickness of the polarizer is reduced, which contributes to the super thin design of the liquid crystal display device.

Figure 6:
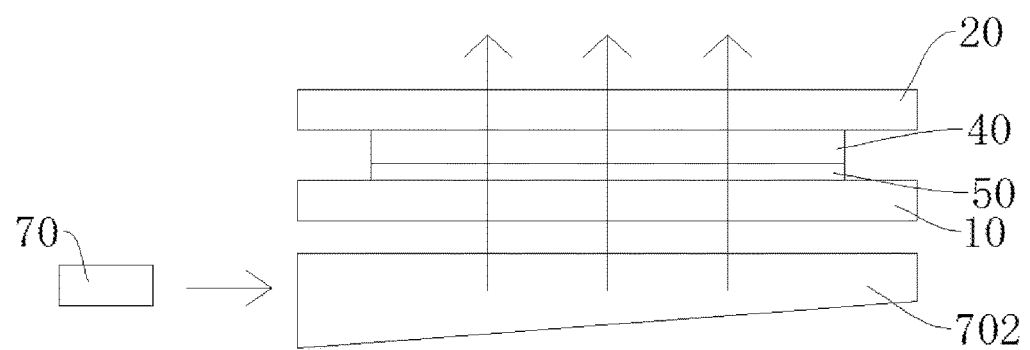
FIG. 6 is a schematic view of the liquid crystal display device in accordance with the second embodiment of the present disclosure.

Referring to FIG. 6, the liquid crystal display panel in the second embodiment adopts the first substrate 10 to be the light guiding plate 702 of the backlight module. The first substrate 10 directs the light beams from the first sidewalls 104 to the second substrate 20. In the second embodiment, the thickness of one light guiding plate 702 is reduced, which contributes to the super thin design of the liquid crystal display device.

In view of the above, the first polarized film 50 adheres to the first substrate 10, and is arranged within the closed cell formed by the first substrate 10, the second substrate 20, and the first frame glue 30. Thus, the first polarized film is prevented from being affected, which enhances the stability of the first polarized film 50 and the second polarized film 52 and ensure the normal operations of the display device. Further, the first polarized film 50 is directly adhered to the first substrate 10 without configuring two supporting protection films. Thus, the thickness of the polarizer is reduced, which contributes to the super thin design of the liquid crystal display device.

Above are embodiments of the present invention, which does not limit the scope of the present invention. Any modifications, equivalent replacements or improvements within the spirit and principles of the embodiment described above should be covered by the protected scope of the invention.

What is claimed is:

1. A display panel, comprising:
a first substrate, a second substrate, and a liquid crystal layer between the first substrate and the second substrate, wherein the display panel also comprises a first polarized film and a first frame glue, the first polarized film adheres to a top surface of the first substrate facing toward a lower surface of the second substrate, the first frame glue connects between the first substrate and the second substrate such that a closed cell is formed cooperatively by the first substrate and the second substrate, and the first polarized film and the liquid crystal layer are received within the closed cell, and a height of the first frame glue being the same with a distance between a lower surface of the first substrate and a top surface of the second substrate.

2. The display panel as claimed in claim 1, wherein the first substrate comprises the top surface and the lower surface of the first substrate and a pair of first sidewalls connecting the top surface and the lower surface of the first substrate, and the second substrate comprises the top surface and the lower surface of the second substrate and a pair of second sidewalls connecting the top surface and the lower surface of the second substrate, and the first frame glue adheres to the first sidewalls and the second sidewalls.

3. The display panel as claimed in claim 2, wherein the display panel further comprises a second frame glue adhering to the lower surface of the second substrate facing toward the first substrate and adhering to a surface of the first polarized film facing toward the second substrate.

4. The display panel as claimed in claim 3, wherein a projection of the second frame glue on the first substrate is within a scope defined by the first polarized film, and the liquid crystal is arranged within a closed space defined by the first polarized film, the second frame glue, and the second substrate.

5. The display panel as claimed in claim 2, wherein the display panel further comprises a second polarized film being adhered to the lower surface of the second substrate facing toward the first substrate.

6. The display panel as claimed in claim 5, wherein the display panel further comprises a second frame glue adhering to the lower surface of the second substrate facing toward the first substrate and adhering to a surface of the first polarized film facing toward the second substrate.

7. The display panel as claimed in claim 6, wherein a projection of the second frame glue on the first substrate is within a scope defined by the first polarized film, and the liquid crystal is arranged within a closed space defined by the first polarized film, the second frame glue, and the second substrate.

8. The display panel as claimed in claim 2, wherein the first frame glue comprises a main body and a protrusion portion on the main body, and the protrusion portion is arranged between the top surface of the first substrate and the lower surface of the second substrate.

9. A liquid crystal display device, comprising:
a backlight module and a display panel, the light beams emitted from a backlight source of the backlight module passing through the display panel such that the display panel displays images, the display panel comprising:
a first substrate, a second substrate, and a liquid crystal layer between the first substrate and the second substrate, wherein the display panel also comprises a first polarized film and a first frame glue, the first polarized film adheres to a top surface of the first substrate facing toward a lower surface of the second substrate, the first frame glue connects between the first substrate and the second substrate such that a closed cell is formed cooperatively by the first substrate and the second substrate, and the first polarized film and the liquid crystal layer are received within the closed cell, and a height of the first frame glue being the same with a distance between a lower surface of the first substrate and a top surface of the second substrate.

10. The liquid crystal display device as claimed in claim 9, wherein the first substrate comprises the top surface and the lower surface of the first substrate and a pair of first sidewalls connecting the top surface and the lower surface of the first substrate, and the second substrate comprises the top surface and the lower surface of the second substrate and a pair of second sidewalls connecting the top surface and the lower surface of the second substrate, and the first frame glue adheres to the first sidewalls and the second sidewalls.

11. The liquid crystal display device as claimed in claim 10, wherein the display panel further comprises a second frame glue adhering to the lower surface of the second substrate facing toward the first substrate and adhering to a surface of the first polarized film facing toward the second substrate.

12. The liquid crystal display device as claimed in claim 11, wherein a projection of the second frame glue on the first substrate is within a scope defined by the first polarized film, and the liquid crystal is arranged within a closed space defined by the first polarized film, the second frame glue, and the second substrate.

13. The liquid crystal display device as claimed in claim 10, wherein the display panel further comprises a second polarized film being adhered to the lower surface of the second substrate facing toward the first substrate.

14. The liquid crystal display device as claimed in claim 13, wherein the display panel further comprises a second frame glue adhering to the lower surface of the second substrate facing toward the first substrate and adhering to a surface of the first polarized film facing toward the second substrate.

15. The liquid crystal display device as claimed in claim 14, wherein a projection of the second frame glue on the first substrate is within a scope defined by the first polarized film, and the liquid crystal is arranged within a closed space defined by the first polarized film, the second frame glue, and the second substrate.

16. The liquid crystal display device as claimed in claim 10, wherein the first frame glue comprises a main body and a protrusion portion on the main body, and the protrusion portion is arranged between the top surface of the first substrate and the lower surface of the second substrate.

17. The liquid crystal display device as claimed in claim 9, wherein the backlight module is an edge-type backlight module, the first substrate is adopted to operate as a light guiding plate of the backlight module to guide the light beams from the first sidewalls to the second substrate.

* * * * *